United States Patent
Li et al.

(10) Patent No.: US 11,489,560 B2
(45) Date of Patent: Nov. 1, 2022

(54) METHOD OF PARAMETER ESTIMATION FOR A MULTI-INPUT MULTI-OUTPUT SYSTEM

(71) Applicant: NATIONAL SUN YAT-SEN UNIVERSITY, Kaohsiung (TW)

(72) Inventors: Yu-Wen Li, Kaohsiung (TW); Chao-Kai Wen, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 277 days.

(21) Appl. No.: 16/990,062

(22) Filed: Aug. 11, 2020

(65) Prior Publication Data

US 2021/0376886 A1 Dec. 2, 2021

(30) Foreign Application Priority Data

May 26, 2020 (TW) .................................. 109117528

(51) Int. Cl.
*H04B 7/0413* (2017.01)
*G06N 20/00* (2019.01)
(Continued)

(52) U.S. Cl.
CPC .......... *H04B 7/0413* (2013.01); *G06N 20/00* (2019.01); *H04W 24/02* (2013.01); *H04W 76/10* (2018.02)

(58) Field of Classification Search
CPC .... H04B 7/0413; H04B 7/0417; G06N 20/00; H04W 24/02; H04W 76/10
See application file for complete search history.

(56) References Cited

U.S. PATENT DOCUMENTS

2003/0158709 A1* 8/2003 Ishida ................ G05B 13/0285
702/189
2018/0098330 A1* 4/2018 Nguyen ................ G06N 20/00
(Continued)

FOREIGN PATENT DOCUMENTS

CN 110830133 A 2/2020
WO WO-2021112360 A1 * 6/2021

OTHER PUBLICATIONS

"Meta Learning-Based MIMO Detectors: Design, Simulation, and Experimental Test"; Zhang et al.; IEEE Transactions on Wireless Communications, vol. 20, No. 2, Feb. 2021 (Year: 2021).*
(Continued)

*Primary Examiner* — Benjamin H Elliott, IV
(74) *Attorney, Agent, or Firm* — WPAT, PC

(57) ABSTRACT

A method of parameter estimation for a multi-input multi-output system based on deep learning is executed. The method includes creating a connection between the base station and a user device entering a coverage of the base station, transmitting real-time channel information from the user device to the base station through the connection, optimizing a parameter for the user device based on the real-time channel information through a deep learning algorithm, transmitting the optimized parameter to the user device, and applying the optimized parameter in a signal detection for the multi-input multi-output system at the user device. The real-time channel information is a channel status of the user device upon the creation of the connection between the base station and the user device. Another method of parameter estimation for a multi-input multi-output system having a base station and a plurality of user devices is also disclosed.

36 Claims, 4 Drawing Sheets

(51) Int. Cl.
*H04W 24/02* (2009.01)
*H04W 76/10* (2018.01)

(56) References Cited

U.S. PATENT DOCUMENTS

| | | | |
|---|---|---|---|
| 2018/0279329 A1* | 9/2018 | Chen | H04B 7/0452 |
| 2018/0367192 A1* | 12/2018 | O'Shea | G06N 3/0445 |
| 2019/0356516 A1* | 11/2019 | Cao | H04L 25/0256 |
| 2020/0145154 A1* | 5/2020 | Black | H04B 7/0689 |
| 2020/0169895 A1* | 5/2020 | Chen | G06N 3/08 |
| 2020/0266910 A1* | 8/2020 | O'Shea | G06N 3/08 |
| 2020/0313736 A1* | 10/2020 | Jana | H04B 7/0639 |
| 2020/0343962 A1* | 10/2020 | Kwon | G06N 3/006 |
| 2020/0358514 A1* | 11/2020 | Landis | G06N 3/0445 |
| 2021/0075691 A1* | 3/2021 | Zeng | H04L 1/203 |
| 2021/0099207 A1* | 4/2021 | Mao | H04B 7/0456 |
| 2021/0110261 A1* | 4/2021 | Lee | H04B 7/04 |
| 2021/0182658 A1* | 6/2021 | Wang | H04L 25/03165 |
| 2021/0218607 A1* | 7/2021 | Ait Aoudia | H04L 27/04 |
| 2021/0314198 A1* | 10/2021 | Kwon | H04L 25/0254 |
| 2021/0320750 A1* | 10/2021 | Muraoka | H04L 1/0057 |
| 2021/0321284 A1* | 10/2021 | Muraoka | H04L 1/0051 |
| 2021/0326701 A1* | 10/2021 | Bai | H04W 72/046 |
| 2021/0345134 A1* | 11/2021 | Ottersten | G06N 3/08 |
| 2021/0376886 A1* | 12/2021 | Li | G06N 20/00 |
| 2022/0014398 A1* | 1/2022 | Andrews | H04L 5/0007 |
| 2022/0140850 A1* | 5/2022 | Luo | G06N 3/0445 |
| | | | 455/298 |

OTHER PUBLICATIONS

"Doubly Iterative Turbo Equalization: Optimization through Deep Unfolding"; Sahin et al.; 2019 IEEE 30th Annual International Symposium on Personal, Indoor and Mobile Radio Communications (PIMRC): Track 1: Fundamentals and PHY (Year: 2019).*

"Deep Learning-Based Massive MIMO CSI Feedback"; Li et al.; 2019 18th International Conference on Optical Communications and Networks (Year: 2018).*

"Deep Learning and Channel Estimation"; Thakkar et al.; 2020 6th International Conference on Advanced Computing & Communication Systems (ICACCS) (Year: 2020).*

* cited by examiner

METHOD OF PARAMETER ESTIMATION FOR A MULTI-INPUT MULTI-OUTPUT SYSTEM

CROSS REFERENCE TO RELATED APPLICATION

The application claims the benefit of Taiwan application serial No. 109117528, filed on May 26, 2020, and the entire contents of which are incorporated herein by reference.

BACKGROUND OF THE INVENTION

1. Field of the Invention

The present invention generally relates to a method of parameter estimation for a Multi-input Multi-output (MIMO) system and, more particularly, to a method of parameter estimation for a MIMO system based on deep learning taking the real-time channel information into consideration.

2. Description of the Related Art

To meet the user's demand of high efficiency, a MIMO antenna system has been developed to increase the channel capacity. The MIMO technology is able to increase the spectrum efficiency without requiring a higher bandwidth. Thus, the MIMO technology has been widely used in the modern communication system. As the modern communication system becomes huge and huge, the complexity of the best method of signal estimation (maximum likelihood estimation) increases exponentially. Furthermore, different algorithms have been used for signal estimation purposes due to the cost and performance considerations. In this regard, some non-linear detector algorithms require manual input of the parameters. The values of these parameters are generally obtained through a number of experiments and by experiences. However, the inputted values will not necessarily generate the best performance.

In another method of parameter estimation, the entire communication network is trained based on the randomly-generated channels, thereby optimizing the detector. However, this method does not use the real-time data in the training process and has a higher complexity in the algorithm. An example of such a method of parameter estimation is seen in Korea Patent Publication No. 101944678B1.

In a further method of parameter estimation, the entire communication network is trained off-line. Then, an on-line detection is carried out based on the trained neural network, achieving an optimized training process. However, this approach also does not use the real-time data in the training process and has a higher complexity in the algorithm. An example of such a method of parameter estimation is seen in China Patent Publication No. 108390705A.

In light of the above, it is necessary to improve the conventional methods of parameter estimation.

SUMMARY OF THE INVENTION

It is therefore the objective of the invention to provide a method of parameter estimation for a MIMO system which performs a deep learning process on the real-time information generated upon the connection between the user device and the base station, thereby quickly obtaining the parameter for the self-detection purpose of the user device.

In an aspect, a method of parameter estimation for a multi-input multi-output system based on deep learning is executed in a communication system having a base station and a user device. The method includes creating a connection between the base station and the user device entering a coverage of the base station, transmitting real-time channel information from the user device to the base station through the connection, optimizing a parameter for the user device based on the real-time channel information through a deep learning algorithm, transmitting the optimized parameter to the user device, and applying the optimized parameter in a signal detection for the multi-input multi-output system at the user device. The real-time channel information is a channel status of the user device upon the creation of the connection between the base station and the user device.

In another aspect, a method of parameter estimation for a multi-input multi-output system based on deep learning is executed in a communication system having a base station and a plurality of user devices. The method includes creating a connection between the base station and each of the plurality of user devices when the plurality of user devices enters a coverage of the base station, transmitting real-time channel information from each of the plurality of user devices to the base station through the connection, optimizing a parameter for each of the plurality of user devices based on the real-time channel information through a deep learning algorithm, storing the real-time channel information of each of the plurality of user devices and the optimized parameters of the plurality of user devices in a storage device of the base station, creating another connection between the base station and another user device entering the coverage of the base station, transmitting another real-time channel information from the other user device to the base station through the other connection, retrieving the storage device by the base station to compare the other real-time channel information with the real-time channel information of each of the plurality of user devices to find out the channel similarity therebetween, transmitting one of the optimized parameters to the other user device by the base station, applying the one of the optimized parameters in a signal detection of the multi-input multi-output system at the other user device, determining whether the other user device has left the coverage of the base station, transmitting a further real-time channel information from the other user device to the base station if the determined result is negative, optimizing the one of the optimized parameters for the other user device based on the further real-time channel information through the deep learning algorithm, transmitting the one of the optimized parameters, which has been optimized, to the other user device by the base station, and applying the one of the optimized parameters, which has been optimized, in the signal detection for the multi-input multi-output system at the other user device. The real-time channel information is a channel status of the each of the plurality of user devices upon the creation of the connection between the base station and the user device. The other real-time channel information is the channel status of the other user device after the creation of the other connection between the base station and the other user device. The one of the optimized parameters corresponds to the real-time channel information of one of the plurality of user devices that has a highest channel similarity to the other real-time channel of the other user device.

In a further aspect, the method of parameter estimation for a multi-input multi-output system based on deep learning is executed in a communication system having a base station and a user device. The method includes creating a connection between the base station and the user device entering a coverage of the base station, transmitting real-time channel information from the user device to the base station through the connection, optimizing a parameter for the user device based on the real-time channel information through a deep learning algorithm, transmitting a plurality of weights of a training network of the deep learning algorithm from the base station to the user device, generating the parameter by the user device based on the plurality of weights of the training network, and applying the generated parameter in a signal detection for the multi-input multi-output system at the user device. The real-time channel information is a channel status of the user device upon the creation of the connection between the base station and the user device.

In yet a further aspect, a method of parameter estimation for a multi-input multi-output system based on deep learning is executed in a communication system having a base station and a plurality of user devices. The method includes creating a connection between the base station and each of the plurality of user devices when the plurality of user devices enters a coverage of the base station, transmitting real-time channel information from each of the plurality of user devices to the base station through the connection, optimizing a parameter for each of the plurality of user devices based on the real-time channel information through a deep learning algorithm, storing the real-time channel information of each of the plurality of user devices and the optimized parameters of the plurality of user devices in a storage device of the base station, creating another connection between the base station and another user device entering the coverage of the base station, transmitting another real-time channel information from the other user device to the base station through the other connection, retrieving the storage device by the base station to compare the other real-time channel information with the real-time channel information of each of the plurality of user devices to find out the channel similarity therebetween, transmitting one of the optimized parameters to the other user device by the base station, applying the one of the optimized parameters in a signal detection of the multi-input multi-output system at the other user device, determining whether the other user device has left the coverage of the base station, transmitting a further real-time channel information from the other user device to the base station if the determined result is negative, optimizing the one of the optimized parameters for the other user device based on the further real-time channel information through the deep learning algorithm, as performed by the base station, transmitting a plurality of weights of a training network of the deep learning algorithm from the base station to the other user device, generating the one of the optimized parameters by the other user device based on the plurality of weights of the training network, and applying the generated parameter in the signal detection for the multi-input multi-output system at the other user device. The real-time channel information is a channel status of the each of the plurality of user devices upon the creation of the connection between the base station and the user device. The other real-time channel information is the channel status of the other user device after the creation of the other connection between the base station and the other user device. The one of the optimized parameters corresponds to the real-time channel information of one of the plurality of user devices that has a highest channel similarity to the other real-time channel of the other user device.

Based on the above, the method of parameter estimation for a MIMO system according to the invention uses only a small amount of the instantaneously-received real-time data (singular values of the channel) to generate a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process. Therefore, the method of the invention is able to improve the signal detection effect and to lower the complexity of the detector of the user end, improving the communication efficiency and providing high speed communication as required in the modern society.

In an example, applying the optimized parameter includes executing an expectation propagation algorithm to proceed with the signal detection of the multi-input multi-output system at the user device. As such, the real signal distribution can be approximated to improve the accuracy in estimation of the parameters.

In the example, applying the optimized parameter includes executing an iteratively interference cancellation algorithm to proceed with the signal detection of the multi-input multi-output system at the user device. As such, the real signal distribution can be approximated to improve the accuracy in estimation of the parameters.

In example, the parameter is damping factor. As such, the renewal of the parameter can be smoothened to improve the convergence of the algorithm.

In example, the real-time channel information is in a form of a plurality of singular values or characteristics of the plurality of singular values. As such, only a small amount of the instantaneously-received real-time data is required in generating a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process.

In example, the characteristics of the plurality of singular values are maximum values, minimum values or average values. As such, only a small amount of the instantaneously-received real-time data is required in generating a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process.

In example, the real-time channel information is in a form of a plurality of channel gains. As such, only a small amount of the instantaneously-received real-time data is required in generating a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process.

In example, the real-time channel information is in a form of a plurality of channel delays. As such, only a small amount of the instantaneously-received real-time data is required in generating a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process.

In example, the method further includes performing a noise normalization and a singular value decomposition on real-time channels of the user device to obtain the plurality of singular values or the characteristics of the plurality of singular values. As such, a matrix with a similar distribution can be generated at the base station for the training purposes. In the same time, the base station is able to compare the channel properties among different user devices based on the distribution of the singular values received, thereby facilitating the optimization of the parameters.

In example, the user device is a mobile device. As such, the quality in mobile communication is improved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
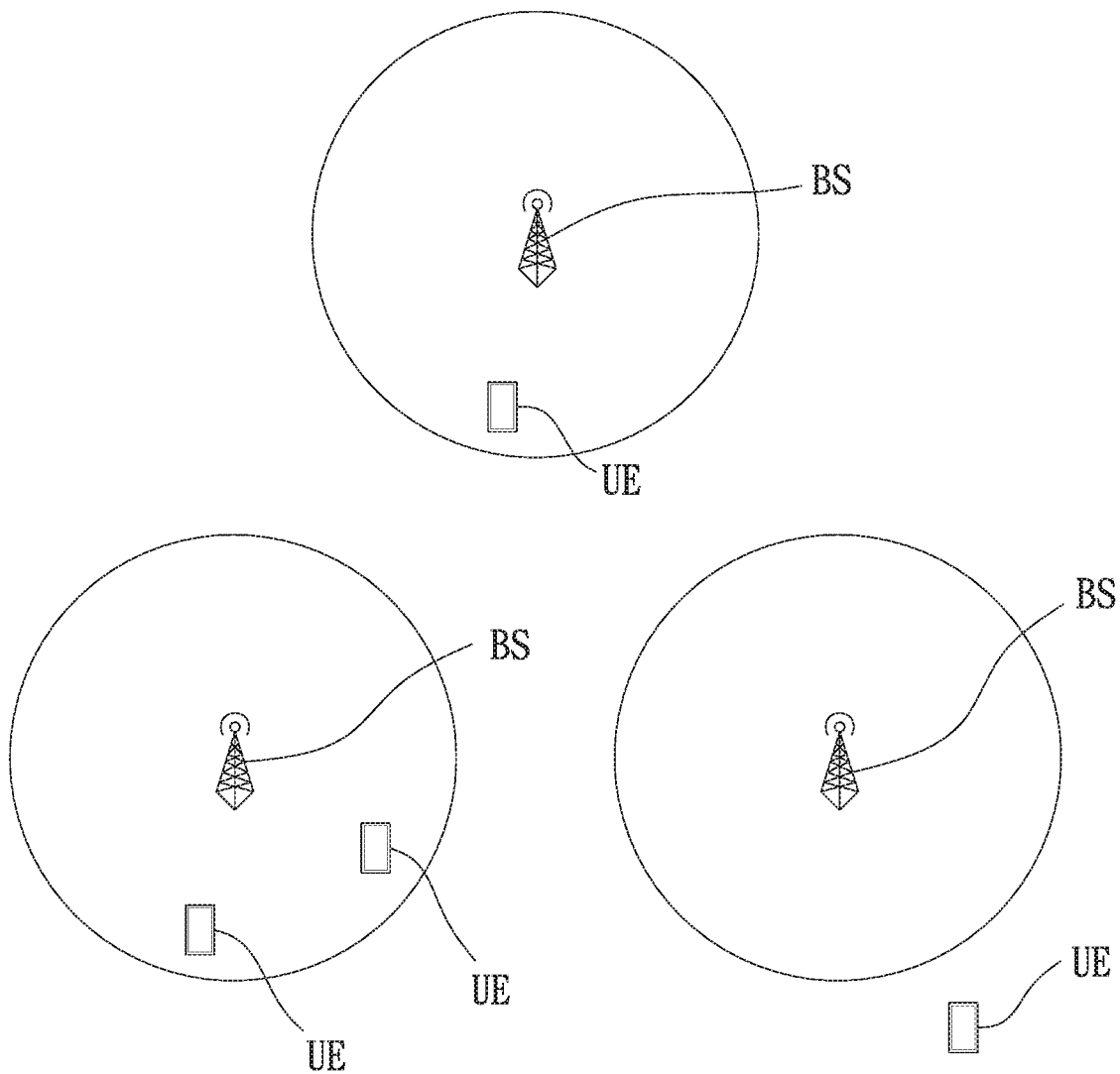
FIG. 1 shows a modern wireless communication system.

FIG. 1 shows a diagram of a wireless communication system including a plurality of base stations BS and a plurality of user device UE. The user device UE may be a mobile device such as a handset, a tablet, a personal digital assistant (PDA), etc. However, this is not used to limit the interpretation of the mobile device, as the invention is intended to encompass all mobile devices. In addition, the wireless communication configuration employs a MIMO system for transmission of the information. The MIMO system is not described herein as it can be readily appreciated by one of ordinary skill in the art.

Figure 2:
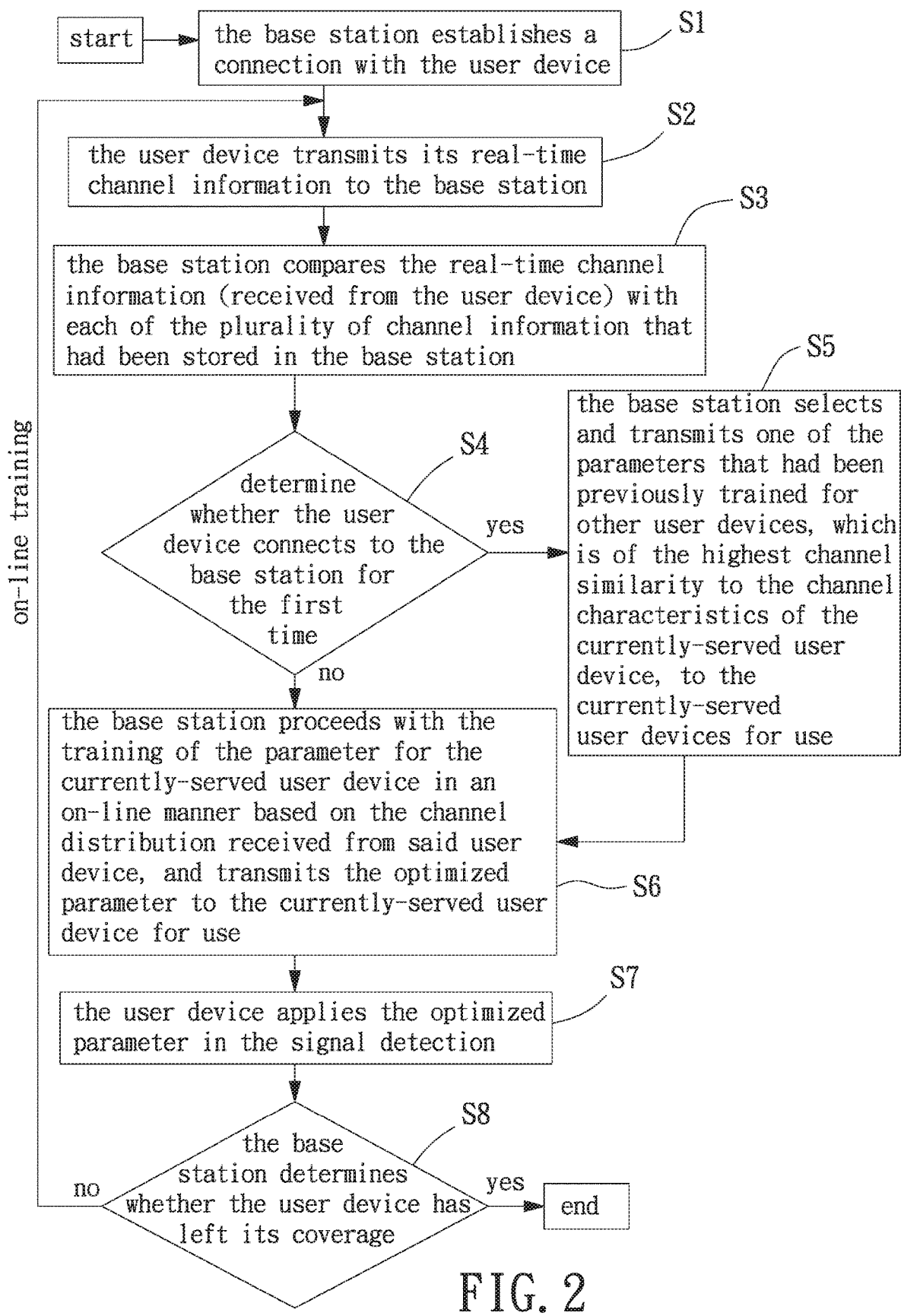
FIG. 2 shows a flowchart of a method of parameter estimation for a MIMO system based on deep learning according to a first embodiment of the invention.

FIG. 2 shows a flowchart of a method of parameter estimation for a MIMO system based on deep learning according to a first embodiment of the invention. In step S1, when a user device UE (shown in FIG. 1) moves from its original cell to an adjoining cell, the base station BS (shown in FIG. 1) of the destination cell establishes a connection with the user device UE. The connection includes an up link (UL) and a down link (DL). In this regard, when the user device UE transfers to the adjacent cell, the channel status of the user device UE in the destination cell is different from it was in the original cell, and the parameter of the detector are also different. Thus, it is required to adjust the parameters of the detector according to the instant channel distribution. Furthermore, since that the deep learning algorithm is mainly carried out in the base station BS and that the there was no link established between the user device UE and the base station BS before, the user device UE is required to transmit its real-time channel information to the base station BS. In this regard, the user device UE transmits its real-time channel information to the base station BS (step S2), such as channel gains, channel delays, or singular values of the MIMO system. Next, the base station BS compares the real-time channel information (received from the user device UE) with each of the plurality of channel information that had been stored in the base station BS (step S3) to find out the channel similarity. The channel comparison is carried out based on the channel characteristics such as the aforementioned channel gains, channel delays, singular values, etc. Next, it is determined whether the user device UE connects to the base station BS for the first time (step S4). If so, since the base station BS does not possess the data that had been previously trained for other user devices UE, the base station BS selects and transmits one of the parameters that had been previously trained (optimized) for other user devices UE, which is of the highest channel similarity to the channel characteristics of the currently-served user device UE, to the currently-served user devices UE for use (step S5). Specifically, before the user device UE enters the coverage of the base station BS, the base station BS had ever created connections with previous user devices UE and had received the real-time channel information from each of said previous user devices UE. In this regard, the base station BS had trained a parameter for each previous user device UE based on the real-time channel information received therefrom. These received real-time channel information and optimized parameters of the previous user devices UE were stored in a storage device of the base station BS for use of any user devices UE subsequently entering the coverage of the base station BS. Therefore, in the step S4, if it is determined that the currently-served base station BS connects to the base station BS for the first time, the base station BS selects and transmits one of said stored parameters, that is of the highest channel similarity to the channel characteristics of the currently-served user device UE, to the currently-served user device UE for use. In the step S4, if it is determined that the current base station BS connects to the base station BS not for the first time, the base station BS proceeds with the training of the parameter for the currently-served user device UE in an on-line manner based on the channel distribution received from said user device UE, and transmits the optimized parameter to the currently-served user device UE for use (step S6). The parameter as referred herein may be damping factor, but is not limited thereto. Moreover, as soon as the currently-served user device UE receives the optimized parameter, the user device UE can apply the parameter in the signal detection (step S7). The application of the optimized parameter in the signal detection can improve the detector of the user device UE in terms of the lowered error rate, increased throughput or channel capacity, etc. Next, the base station BS determines whether the user device UE has left its coverage (step S8). If so, the flow ends, otherwise the flow goes back to step S2 to keep optimizing the parameter for the user device UE. It is noted that since the base station BS has received the previously-trained parameter in step S5 that has the most similar channel distribution to the currently-served user device UE, the channel distribution of the currently-served user device UE can be obtained in high level of reality in the following step S6. Although it is described above that only one parameter is trained, there are actually a number of parameters trained. The description of one parameter trained is simply for ease of explanations.

It can be known from the above that the method of parameter estimation for a MIMO system based on deep learning according to the invention, as compared with the conventional method of parameter estimation, is characterized in including the real-time channel information in training the required parameter to thereby generate a larger amount of training sets for training purposes. As such, the optimized channel characteristics can be obtained through deep learning. As an example of an eight-to-eight MIMO system, the conventional method of parameter estimation requires the transmission of 64 sets of data for only a single channel parameter of the MIMO system; thus, the calculation burden is high and it is difficult to timely transmit these sets of data to the base station BS. On the contrast, the channel information can be represented by channel gains and delays in the invention, therefore the amount of data requiring transmission is less than the entire sets of data transmitted by the conventional method. Furthermore, if the singular values are retrieved, a single channel would require transmission of only eight sets of data in a system with eight transmission ports, further reducing the amount of data transmitted. The extraction is carried out by performing a noise normalization on the received real-time channel information as well as a singular value decomposition (SVD), as follow:

$$H = U\Sigma V^H$$

In the above, "U" is a unitary matrix which can be randomly generated. As such, after the user device UE transmits the singular values to the base station BS, the base station BS would be able to generate a similar unitary matrix H for the training purposes. In the same time, the base station BS is able to compare the channel properties among different user devices UE based on the distribution of the singular values received, thereby facilitating the optimization of the parameters. However, it is noted that the singular value decomposition can be performed on the received channel prior to the noise normalization. The application is not limited to either option. Furthermore, in another embodiment, the channel information is not necessarily represented by the singular values, but is represented by the characteristics of the singular values such as the maximum value, the minimum value, or the average value of the singular values.

During the parameter optimization of the method of the invention, a deep learning algorithm is executed by the base station. In this regard, the user device executes an expectation propagation algorithm for the signal detection purposes. The expectation propagation algorithm is a nonlinear signal detector which approximates to the real signal distribution through a number of times of iterations. The larger the number of times of the iterations, the more accurate the probabilistic distribution obtained. However, this consumes more time and adversely increases the complexity of the detector. In order to improve the robustness and stability of the algorithm, the damping factor is introduced to overcome the incomplete convergence of the algorithm. The use of the damping factor introduces a low-pass filter effect which smoothens the renewal of the parameter to thereby improve the convergence of the algorithm. The damping factor is manually set based on the experience. However, the user device can also execute an iteratively interference cancellation algorithm for the signal detection purposes.

Table 1 shows the comparison of the bit error rates obtained by the expectation propagation algorithm with the consideration of the real-time channel information (the invention) and without the consideration of the real-time channel information (conventionally) under different environments with different signal-to-noise ratios where the parameter value is manually set. In the experiment, the simulation is carried out under an eight-to-eight MIMO system employing 16 QAM (Quadrature Amplitude Modulation), in which the Rayleigh fading channel is used. In addition, the higher the signal-to-noise ratio, the stronger the signal energy.

TABLE 1

| | signal-to-noise ratio | | | | |
| --- | --- | --- | --- | --- | --- |
| | −1 dB | 4 dB | 9 dB | 14 dB | 19 dB |
| EP (L = 5) | $2.8430e^{-1}$ | $1.8092e^{-1}$ | $9.7812e^{-2}$ | $1.4781e^{-2}$ | $6.7563e^{-4}$ |
| EP (L = 10) | $2.7954e^{-1}$ | $1.7729e^{-1}$ | $8.3663e^{-2}$ | $8.8561e^{-3}$ | $3.2534e^{-4}$ |
| EP (L = 15) | $2.7973e^{-1}$ | $1.7737e^{-1}$ | $8.1863e^{-2}$ | $7.5135e^{-3}$ | $2.3675e^{-4}$ |
| the invention | $2.7753e^{-1}$ | $1.7652e^{-1}$ | $7.9965e^{-2}$ | $6.7721e^{-3}$ | $1.5611e^{-4}$ |

In Table 1, the conventional method employs three numbers of times of iterations: L=5, L=10 and L=15. The higher the signal-to-noise ratio, the lower the bit error rate of the signal detection. Also, the higher the number of times of the iterations, the lower the bit error rate of the signal detection. As is previously mentioned, the invention uses deep learning method to train the damping factor at the base station. It can be seen from Table 1 that the result of L=5 obtained under the proposed method of the invention is as good as (or even better than) that obtained under 15 times of iterations (L=15) of the conventional method. Therefore, it can be proven that the method of parameter estimation of the invention can attain the results of the conventional method under less time consumption. Advantageously, the complexity of the detector at the user end can be reduced. Besides, in another embodiment, the damping factor can also be trained at the user device.

Figure 3:
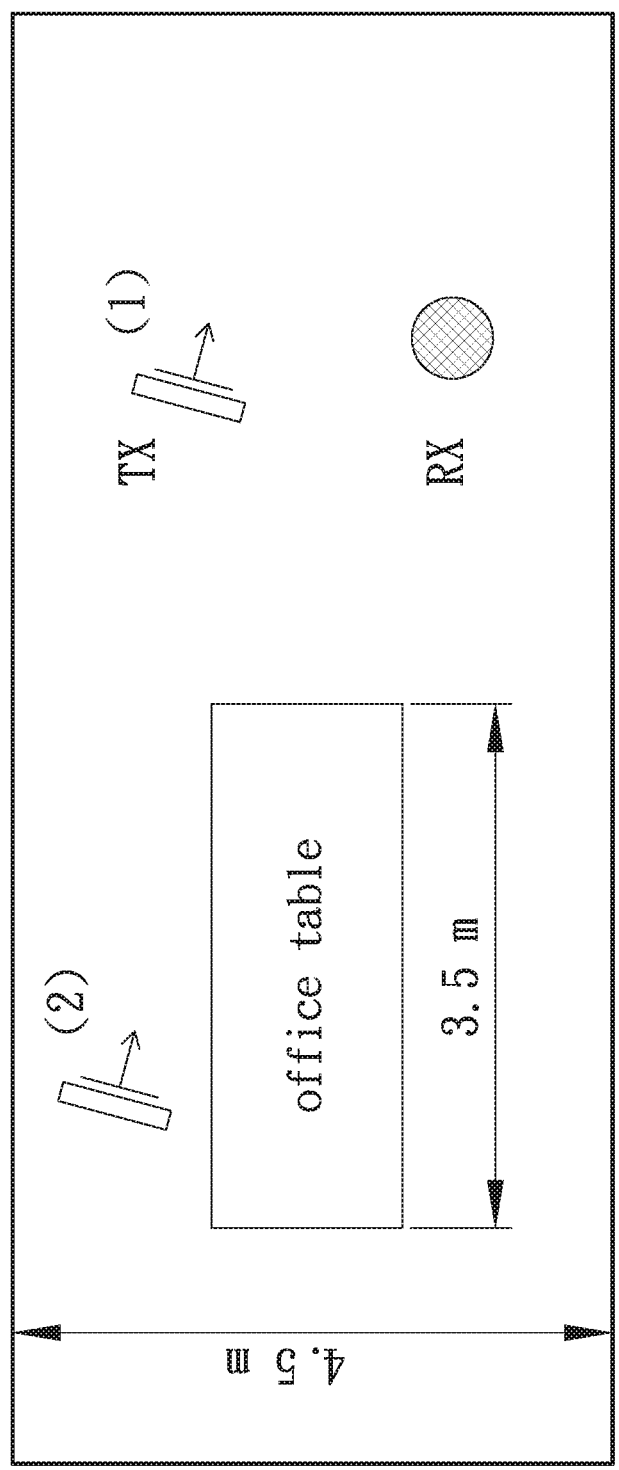
FIG. 3 shows an indoor environment where the method of parameter estimation for a MIMO system according to the first embodiment of the invention is performed.

FIG. 3 shows an indoor environment where the method of parameter estimation for a MIMO system based on deep learning according to the invention is performed, with an office table having a length of 3.5 m being arranged. The space has a width of 4.5 m as shown. The invention provides six simulation models. In the first model, the receiving end (RX) is disposed as shown, and the transmitting end (TX) is disposed at the position marked "(1)." In the second model, the antenna remains in the same position but there is someone waking around the area. In the third model, the antenna remains in the same position and the measurement has been carried out for 30 minutes. In the fourth model, the antenna remains in the same position but the transmission antenna changes its angle to a first angle. In the fifth model, the antenna remains in the same position but the transmission antenna changes its angle to a second angle. In the sixth model, the long-distance test is carried out by moving the transmitting antenna (TX) to the position marked "(2)." Based on this, the bit error rates of the signal detection in the six models have been shown in Table 2 below:

TABLE 2

Measured Results under Various Simulation Models

| model | model 1 | model 2 | model 3 | model 4 | model 5 | model 6 |
| --- | --- | --- | --- | --- | --- | --- |
| EP | $9.0649e^{-4}$ | $1.1147e^{-3}$ | $3.7734e^{-4}$ | $1.1255e^{-2}$ | $4.6842e^{-4}$ | $9.5767e^{-3}$ |
| EPNet (1) | $3.8602e^{-4}$ | $8.6312e^{-4}$ | $2.6024e^{-4}$ | $8.9001e^{-3}$ | $3.9903e^{-4}$ | $6.4885e^{-3}$ |
| EPNet | $3.8602e^{-4}$ | $3.0722e^{-4}$ | $2.2554e^{-4}$ | $6.0939e^{-3}$ | $3.0795e^{-4}$ | $4.3156e^{-3}$ |

In the above simulations, turbo coding is used. Label "EP" represents the simple expectation propagation algorithm. Label "EPNet (1)" represents the expectation propagation algorithm along with the use of the parameter trained under model 1, with the trained parameter used to generate the measured data. Label "EPNet" represents the expectation propagation algorithm with the addition of the respective models of the data. It can be seen from Table 2 that the signal detection effect of the detector can be improved without increasing the complexity of the detector under the optimization of the parameter taking the real-time channel information of the user device into consideration.

In the above embodiment, the base station receives the real-time channel information from the user device and proceeds with the optimization of the parameter based on the received information. In this regard, the base station transmits the trained parameter to the user device which in turn applies the parameter in the signal detection. However, in another embodiment of the invention, upon the receipt of the real-time channel information, the base station can train only a small portion of the parameters based on the deep learning, and transmits the weights of the training network to the user device. Based on this, the user device can generate the required parameter by itself according to the weights of the training network, and subsequently applies the parameter in the signal detection. The flowchart is shown in FIG. 4.

Figure 4:
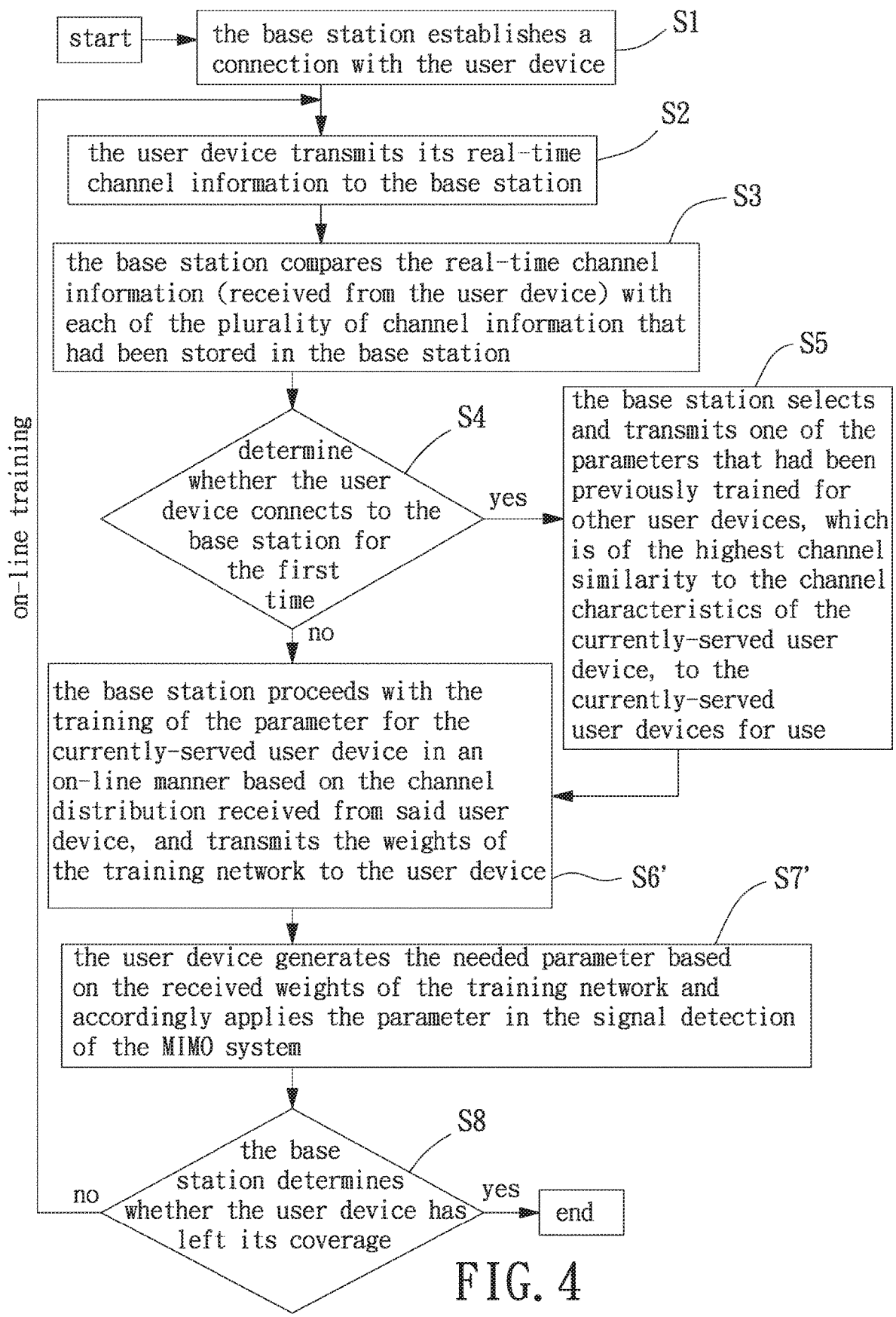
FIG. 4 shows a flowchart of a method of parameter estimation for a MIMO system based on deep learning according to a second embodiment of the invention.

FIG. 4 shows a flowchart of a method of parameter estimation for a MIMO system based on deep learning according to a second embodiment of the invention. In step S1, when a user device UE (shown in FIG. 1) moves from its original cell to an adjoining cell, the base station BS (shown in FIG. 1) of the destination cell establishes a connection with the user device UE (shown in FIG. 1). Similarly, in step S2, the base station BS receives the real-time channel information from the user device UE. Next, in step S3, the base station BS compares the real-time channel information received from the user device UE with the plurality of channel information that had been stored in the base station BS. In step S4, it is determined whether the user device UE connects to the base station BS for the first time. If so, since the base station BS does not possess the data that had been trained for the user device UE, the base station BS selects and transmits one of the parameters that had been previously trained for other user devices UE, which is of the highest channel similarity to the channel characteristics of the currently-served user device UE, to the currently-served user devices UE for use (step S5). If it is determined that the current base station BS connects to the base station BS not for the first time in step S4, the base station BS proceeds with the training of the parameter for the currently-served user device UE in an on-line manner based on the channel distribution received from said user device UE, and transmits the weights of the training network to the user device UE (step S6'). Based on this, the user device UE generates the needed parameter based on the received weights of the training network and accordingly applies the parameter in the signal detection of the MIMO system (step S7'). In step S8, the base station BS determines whether said user device UE has left its coverage. If so, the flow ends. If not, the flow goes back to step S2 to keep optimizing the parameter for the user device UE. It is noted that in step S5, since the user device UE has applied the previously-trained parameter (which has the highest channel similarity to the user device UE) in the signal detection (steps S6' and S7'), the real channel distribution of the user device UE can be quickly obtained. As compared with the flowchart of FIG. 2 where the channel status of the user device UE instantly changes as the user device UE proceeds with the signal detection during the deep learning process, the method of parameter estimation for a MIMO system in this embodiment uses the weights of the training network to generate the parameter according to the channel characteristics of the present environment. In addition, since the user device UE generates the needed parameter by itself, an improved signal detection effect can be obtained quickly.

Based on the above, the method of parameter estimation for a MIMO system according to the invention uses only a small amount of the instantaneously-received real-time data (singular values of the channel) to generate a large amount of data by combining the estimated environmental information with the transmitted information and noise. The large amount of data is generated at the local end based on the high similarity of the channel distribution among the adjacent areas. The large amount of data as generated has a high similarity to the real data distribution and serves as the trained data for the deep learning algorithm. In this regard, the user device applies the obtained parameter in the algorithm to thereby speed up the deep learning process. Therefore, the method of the invention is able to improve the signal detection effect and to lower the complexity of the detector of the user end, improving the communication efficiency and providing high speed communication as required in the modern society.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method of parameter estimation for a multi-input multi-output system based on deep learning, as executed in a communication system having a base station and a user device, comprising:
    creating a connection between the base station and the user device entering a coverage of the base station;
    transmitting real-time channel information from the user device to the base station through the connection, wherein the real-time channel information is a channel status of the user device upon the creation of the connection between the base station and the user device, wherein the real-time channel information is in a form of a plurality of singular values or characteristics of the plurality of singular values;

optimizing a parameter for the user device based on the real-time channel information through a deep learning algorithm, as performed by the base station;

transmitting the optimized parameter to the user device;

applying the optimized parameter in a signal detection for the multi-input multi-output system at the user device; and performing a noise normalization and a singular value decomposition on real-time channels of the user device to obtain the plurality of singular values or the characteristics of the plurality of singular values.

2. The method of parameter estimation for the multi-input multi-output system based on deep learning as claimed in claim 1, wherein applying the optimized parameter includes executing an expectation propagation algorithm to proceed with the signal detection of the multi-input multi-output system at the user device.

3. The method of parameter estimation for the multi-input multi-output system based on deep learning as claimed in claim 1, wherein applying the optimized parameter includes executing an iteratively interference cancellation algorithm to proceed with the signal detection of the multi-input multi-output system at the user device.

4. The method of parameter estimation for the multi-input multi-output system based on deep learning as claimed in claim 1, wherein the parameter is damping factor.

5. The method of parameter estimation for the multi-input multi-output system based on deep learning as claimed in claim 1, wherein the characteristics of the plurality of singular values are maximum values, minimum values or average values.

6. The method of parameter estimation for the multi-input multi-output system based on deep learning as claimed in claim 1, wherein the user device is a mobile device.

7. A method of parameter estimation for a multi-input multi-output system based on deep learning, as executed in a communication system having a base station and a plurality of user devices, with the method comprising:

creating a connection between the base station and each of the plurality of user devices when the plurality of user devices enters a coverage of the base station;

transmitting real-time channel information from each of the plurality of user devices to the base station through the connection, wherein the real-time channel information is a channel status of the each of the plurality of user devices upon the creation of the connection between the base station and the user device;

optimizing a parameter for each of the plurality of user devices based on the real-time channel information through a deep learning algorithm, as performed by the base station;

storing the real-time channel information of each of the plurality of user devices and the optimized parameters of the plurality of user devices in a storage device of the base station;

creating another connection between the base station and another user device entering the coverage of the base station;

transmitting another real-time channel information from the other user device to the base station through the other connection, wherein the other real-time channel information is the channel status of the other user device after the creation of the other connection between the base station and the other user device;

retrieving the storage device by the base station to compare the other real-time channel information with the real-time channel information of each of the plurality of user devices to find out the channel similarity therebetween;

transmitting one of the optimized parameters to the other user device by the base station, wherein the one of the optimized parameters corresponds to the real-time channel information of one of the plurality of user devices that has a highest channel similarity to the other real-time channel of the other user device;

applying the one of the optimized parameters in a signal detection of the multi-input multi-output system at the other user device;

determining whether the other user device has left the coverage of the base station;

transmitting a further real-time channel information from the other user device to the base station if the determined result is negative;

optimizing the one of the optimized parameters for the other user device based on the further real-time channel information through the deep learning algorithm, as performed by the base station;

transmitting the one of the optimized parameters, which has been optimized, to the other user device by the base station; and applying the one of the optimized parameters, which has been optimized, in the signal detection for the multi-input multi-output system at the other user device.

8. The method of parameter estimation for the multi-input multi-output system based on deep learning as claimed in claim 7, wherein applying the one of the optimized parameters includes executing an expectation propagation algorithm to proceed with the signal detection of the multi-input multi-output system at the other user device.

9. The method of parameter estimation for the multi-input multi-output system based on deep learning as claimed in claim 7, wherein applying the one of the optimized parameters includes executing an iteratively interference cancellation algorithm to proceed with the signal detection of the multi-input multi-output system at the other user device.

10. The method of parameter estimation for the multi-input multi-output system based on deep learning as claimed in claim 7, wherein the one of the parameters is damping factor.

11. The method of parameter estimation for the multi-input multi-output system based on deep learning as claimed in claim 7, wherein the further real-time channel information is in a form of a plurality of singular values or characteristics of the plurality of singular values.

12. The method of parameter estimation for the multi-input multi-output system based on deep learning as claimed in claim 11, wherein the characteristics of the plurality of singular values are maximum values, minimum values or average values.

13. The method of parameter estimation for the multi-input multi-output system based on deep learning as claimed in claim 7, wherein the further real-time channel information is in a form of a plurality of channel gains.

14. The method of parameter estimation for the multi-input multi-output system based on deep learning as claimed in claim 7, wherein the further real-time channel information is in a form of a plurality of channel delays.

15. The method of parameter estimation for the multi-input multi-output system based on deep learning as claimed in claim 11, further comprising performing a noise normalization and a singular value decomposition on real-time channels of the other user device to obtain the plurality of singular values or the characteristics of the plurality of singular values.

16. The method of parameter estimation for the multi-input multi-output system based on deep learning as claimed in claim 7, wherein the user device is a mobile device.

17. A method of parameter estimation for a multi-input multi-output system based on deep learning, as executed in a communication system having a base station and a user device, with the method comprising:
creating a connection between the base station and the user device entering a coverage of the base station;
transmitting real-time channel information from the user device to the base station through the connection, wherein the real-time channel information is a channel status of the user device upon the creation of the connection between the base station and the user device;
optimizing a parameter for the user device based on the real-time channel information through a deep learning algorithm, as performed by the base station;
transmitting a plurality of weights of a training network of the deep learning algorithm from the base station to the user device;
generating the parameter by the user device based on the plurality of weights of the training network; and
applying the generated parameter in a signal detection for the multi-input multi-output system at the user device.

18. The method of parameter estimation for the multi-input multi-output system based on deep learning as claimed in claim 17, wherein applying the optimized parameter includes executing an expectation propagation algorithm to proceed with the signal detection of the multi-input multi-output system at the user device.

19. The method of parameter estimation for the multi-input multi-output system based on deep learning as claimed in claim 17, wherein applying the optimized parameter includes executing an iteratively interference cancellation algorithm to proceed with the signal detection of the multi-input multi-output system at the user device.

20. The method of parameter estimation for the multi-input multi-output system based on deep learning as claimed in claim 17, wherein the parameter is damping factor.

21. The method of parameter estimation for the multi-input multi-output system based on deep learning as claimed in claim 17, wherein the real-time channel information is in a form of a plurality of singular values or characteristics of the plurality of singular values.

22. The method of parameter estimation for the multi-input multi-output system based on deep learning as claimed in claim 21, wherein the characteristics of the plurality of singular values are maximum values, minimum values or average values.

23. The method of parameter estimation for the multi-input multi-output system based on deep learning as claimed in claim 17, wherein the real-time channel information is in a form of a plurality of channel gains.

24. The method of parameter estimation for the multi-input multi-output system based on deep learning as claimed in claim 17, wherein the real-time channel information is in a form of a plurality of channel delays.

25. The method of parameter estimation for the multi-input multi-output system based on deep learning as claimed in claim 21, further comprising performing a noise normalization and a singular value decomposition on real-time channels of the user device to obtain the plurality of singular values or the characteristics of the plurality of singular values.

26. The method of parameter estimation for the multi-input multi-output system based on deep learning as claimed in claim 17, wherein the user device is a mobile device.

27. A method of parameter estimation for a multi-input multi-output system based on deep learning, as executed in a communication system having a base station and a plurality of user devices, with the method comprising:
creating a connection between the base station and each of the plurality of user devices when the plurality of user devices enters a coverage of the base station;
transmitting real-time channel information from each of the plurality of user devices to the base station through the connection, wherein the real-time channel information is a channel status of the each of the plurality of user devices upon the creation of the connection between the base station and the user device;
optimizing a parameter for each of the plurality of user devices based on the real-time channel information through a deep learning algorithm, as performed by the base station;
storing the real-time channel information of each of the plurality of user devices and the optimized parameters of the plurality of user devices in a storage device of the base station;
creating another connection between the base station and another user device entering the coverage of the base station;
transmitting another real-time channel information from the other user device to the base station through the other connection, wherein the other real-time channel information is the channel status of the other user device after the creation of the other connection between the base station and the other user device;
retrieving the storage device by the base station to compare the other real-time channel information with the real-time channel information of each of the plurality of user devices to find out the channel similarity therebetween;
transmitting one of the optimized parameters to the other user device by the base station, wherein the one of the optimized parameters corresponds to the real-time channel information of one of the plurality of user devices that has a highest channel similarity to the other real-time channel of the other user device;
applying the one of the optimized parameters in a signal detection of the multi-input multi-output system at the other user device;
determining whether the other user device has left the coverage of the base station;
transmitting a further real-time channel information from the other user device to the base station if the determined result is negative;
optimizing the one of the optimized parameters for the other user device based on the further real-time channel information through the deep learning algorithm, as performed by the base station;
transmitting a plurality of weights of a training network of the deep learning algorithm from the base station to the other user device;
generating the one of the optimized parameters by the other user device based on the plurality of weights of the training network; and applying the generated parameter in the signal detection for the multi-input multi-output system at the other user device.

28. The method of parameter estimation for the multi-input multi-output system based on deep learning as claimed in claim 27, wherein applying the one of the optimized parameters includes executing an expectation propagation algorithm to proceed with the signal detection of the multi-input multi-output system at the other user device.

29. The method of parameter estimation for the multi-input multi-output system based on deep learning as claimed in claim 27, wherein applying the one of the optimized parameters includes executing an iteratively interference cancellation algorithm to proceed with the signal detection of the multi-input multi-output system at the other user device.

30. The method of parameter estimation for the multi-input multi-output system based on deep learning as claimed in claim 27, wherein the one of the parameters is damping factor.

31. The method of parameter estimation for the multi-input multi-output system based on deep learning as claimed in claim 27, wherein the further real-time channel information is in a form of a plurality of singular values or characteristics of the plurality of singular values.

32. The method of parameter estimation for the multi-input multi-output system based on deep learning as claimed in claim 31, wherein the characteristics of the plurality of singular values are maximum values, minimum values or average values.

33. The method of parameter estimation for the multi-input multi-output system based on deep learning as claimed in claim 27, wherein the further real-time channel information is in a form of a plurality of channel gains.

34. The method of parameter estimation for the multi-input multi-output system based on deep learning as claimed in claim 27, wherein the further real-time channel information is in a form of a plurality of channel delays.

35. The method of parameter estimation for the multi-input multi-output system based on deep learning as claimed in claim 31, further comprising performing a noise normalization and a singular value decomposition on real-time channels of the other user device to obtain the plurality of singular values or the characteristics of the plurality of singular values.

36. The method of parameter estimation for the multi-input multi-output system based on deep learning as claimed in claim 27, wherein the user device is a mobile device.

* * * * *